(12) United States Patent
Knecht et al.

(10) Patent No.: US 11,311,950 B2
(45) Date of Patent: Apr. 26, 2022

(54) INTERNAL MILLING CUTTER

(71) Applicant: SANDVIK INTELLECTUAL PROPERTY AB, Sandviken (SE)

(72) Inventors: Stefan Knecht, Meerbusch (DE); Rudolf Lohr, Neuss (DE)

(73) Assignee: Sandvik Intellectual Property AB, Sandviken (SE)

( * ) Notice: Subject to any disclaimer, the term of this patent is extended or adjusted under 35 U.S.C. 154(b) by 383 days.

(21) Appl. No.: 16/469,190

(22) PCT Filed: Sep. 22, 2017

(86) PCT No.: PCT/EP2017/074049
§ 371 (c)(1),
(2) Date: Jun. 13, 2019

(87) PCT Pub. No.: WO2018/108344
PCT Pub. Date: Jun. 21, 2018

(65) Prior Publication Data
US 2020/0023448 A1    Jan. 23, 2020

(30) Foreign Application Priority Data

Dec. 14, 2016  (EP) .................................... 16204058

(51) Int. Cl.
*B23C 5/22*  (2006.01)
*B23C 5/08*  (2006.01)
*B23C 3/06*  (2006.01)

(52) U.S. Cl.
CPC .............. *B23C 5/2234* (2013.01); *B23C 3/06* (2013.01); *B23C 5/08* (2013.01); *B23C 2210/503* (2013.01)

(58) Field of Classification Search
CPC ... B23C 2210/503; B23C 5/08; B23C 5/2234; B23C 5/26; B23C 2240/04;
(Continued)

(56) References Cited

U.S. PATENT DOCUMENTS 1,125,102 A * 1/1915 Huther ...................... B23C 5/22
                                                          407/47
2,544,920 A * 3/1951 Fullerton ............. B23D 61/023
                                                          83/838
(Continued)

FOREIGN PATENT DOCUMENTS

AT         406028 B      1/2000
DE       2515937 B1     10/1976
(Continued)

*Primary Examiner* — Sara Addisu
(74) *Attorney, Agent, or Firm* — Corinne R. Gorski

(57) ABSTRACT

An internal milling cutter includes a carrier disk having a centre axis defining an axis of rotation of the milling cutter, a plurality of separated tool holder segments removably mounted at the inner circumference of the carrier disk, and at least one clamp for each tool holder segment mounted either on the carrier disk or on the tool holder segment. Each of the tool holder segments at its inner circumference includes at least one cutting insert seat with a mounting element for a cutting insert or at least one cutting edge. The clamp is located and arranged such that it generates a force in the axial direction pressing the axial contact surface of the tool holder segment onto the axial abutment surface of the carrier disk, and the clamp is mounted movably in a radial direction of the carrier disk between a locking position and a releasing position.

13 Claims, 11 Drawing Sheets

(58) Field of Classification Search
CPC ... B23C 2215/20; B23C 2220/68; B23C 3/06; B23C 2210/66; B23Q 3/155
See application file for complete search history.

(56) References Cited

U.S. PATENT DOCUMENTS

| | | | | |
|---|---|---|---|---|
| 2,670,766 | A * | 3/1954 | Hiltebrand | B23D 61/023 83/838 |
| 2,828,672 | A * | 4/1958 | McMullen | B23F 23/1206 409/53 |
| 3,242,553 | A * | 3/1966 | Bogsten | B23C 5/22 407/41 |
| 4,204,787 | A * | 5/1980 | McCray | B23C 5/2291 409/234 |
| 4,456,408 | A * | 6/1984 | Glasow | B23C 5/2278 407/110 |
| 4,563,929 | A * | 1/1986 | Ringlee | A01G 23/091 144/241 |
| 4,570,517 | A * | 2/1986 | Souza | B23D 61/026 83/666 |
| 5,158,400 | A * | 10/1992 | Skinner | B23F 21/243 407/12 |
| 5,395,186 | A * | 3/1995 | Qvart | B23C 5/006 407/46 |
| 5,542,791 | A * | 8/1996 | Ball | B23F 23/1206 407/21 |
| 6,068,430 | A * | 5/2000 | Saeki | B23C 5/26 407/12 |
| 6,203,477 | B1 | 3/2001 | Shimomura | |
| 9,370,831 | B2 * | 6/2016 | Heinloth | B23C 3/06 |
| 2008/0206007 | A1 * | 8/2008 | Hughes | B23C 3/30 409/51 |
| 2010/0104382 | A1 * | 4/2010 | Heinloth | B23C 5/08 407/16 |
| 2010/0316459 | A1 * | 12/2010 | Heinloth | B23B 31/008 409/234 |
| 2011/0222973 | A1 * | 9/2011 | Baer | B23C 5/2462 407/44 |
| 2012/0001197 | A1 | 1/2012 | Liaw | |
| 2012/0011979 | A1 * | 1/2012 | Hosp | B23C 5/2234 83/663 |
| 2012/0076599 | A1 * | 3/2012 | Heinloth | B23C 5/241 409/131 |
| 2012/0148351 | A1 * | 6/2012 | Heinloth | B23C 5/26 407/44 |
| 2012/0230794 | A1 * | 9/2012 | Leisner | B23C 5/08 409/234 |
| 2015/0030397 | A1 * | 1/2015 | Heinloth | B23C 5/08 407/12 |
| 2015/0037107 | A1 * | 2/2015 | Buob | B23C 5/2462 407/44 |
| 2016/0107250 | A1 * | 4/2016 | Denks | B23C 5/2234 407/12 |
| 2016/0236286 | A1 * | 8/2016 | Heinloth | B23C 5/08 |
| 2017/0165768 | A1 * | 6/2017 | Herud | B23D 43/06 |
| 2018/0243836 | A1 * | 8/2018 | Bar | B23C 5/006 |
| 2020/0023448 | A1 * | 1/2020 | Knecht | B23C 5/08 |

FOREIGN PATENT DOCUMENTS

| | | | | |
|---|---|---|---|---|
| DE | 4037984 | A1 * | 6/1991 | B23D 61/06 |
| JP | 56015910 | A * | 2/1981 | B23C 5/22 |
| JP | 57189718 | A * | 11/1982 | B23C 5/08 |
| JP | 61086120 | A * | 5/1986 | B23C 5/22 |
| JP | 06170628 | A * | 6/1994 | |
| JP | H06262423 | A | 9/1994 | |
| JP | 08071829 | A * | 3/1996 | B23C 3/30 |
| JP | H0911016 | A | 1/1997 | |
| JP | 09076112 | A * | 3/1997 | |
| JP | 2004283935 | A | 10/2004 | |
| JP | 2006116627 | A * | 5/2006 | |
| JP | 2007152535 | A * | 6/2007 | B23C 5/12 |
| JP | 2009075305 | A | 4/2009 | |
| JP | 2013146790 | A * | 8/2013 | B23F 21/146 |

* cited by examiner

INTERNAL MILLING CUTTER

RELATED APPLICATION DATA

This application is a § 371 National Stage Application of PCT International Application No. PCT/EP2017/074049 filed Sep. 22, 2017, claiming priority to EP 16204058.8, filed Dec. 14, 2016.

TECHNICAL FIELD

The present disclosure relates to an internal milling cutter. Internal milling cutters are typically used for chip removing machining of crankshafts and other workpieces having rotational symmetry or having one or more portions being circular in cross section. The internal milling cutter has a ring-shaped carrier disk having an outer circumference, an inner circumference and centre axis defining an axis of rotation of the milling cutter. In order to allow a milling of an outer surface a workpiece is inserted into the ring formed by the carrier disk and the carrier disk along its inner circumference comprises at least one cutting insert seat to be equipped with a cutting insert or at least one cutting edge effecting the required cutting operation of the cutter.

The present disclosure in particular relates to an internal milling cutter for metal cutting, in particular for the machining of a blank made of an iron-based metal to form a crankshaft.

The particular type of the internal milling cutter to be considered in this disclosure has a plurality of separated tool holder segments removably mounted at the inner circumference of the carrier disk, wherein the plurality of tool holder segments together form a ring having an inner circumference. These tool holder segments carry the actual cutting insert seats or even the cutting edges and can be prepared before mounting.

In addition the carrier disk comprises an axial abutment surface for each of the tool holder segments providing a support of an axial contact surface of the tool holder segment in an axial direction of the carrier disk. At least at least one clamp is provided for each tool holder segment, wherein the clamp is either mounted on the carrier disk or on the tool holder segment. The clamp is located and arranged such that it generates a force in the axial direction pressing the axial contact surface of the tool holder segment onto the axial abutment surface of the carrier disk.

From US 2012/0011979 A1 a rotary cutting tool is known having a main body with one or more segments exchangeably fastened to the inner circumference of the main body. The exchangeable fastening of the segments to the main body is effected by a clamping piece which is dovetailed on two sides and is additionally configured with a taper that wedges in the axial direction. The dovetailed clamping piece is located between each segment and the main body when viewed in a radial direction. The dovetailed clamping piece has the disadvantage that it requires complete dismounting before any of the segments can be removed from the main body. Furthermore, the dovetailed clamping piece arranged in a radial direction between the tool holder segment and the main body prevents a free thermal expansion of the tool holder segment in the radial direction.

SUMMARY

It is thus an aspect of the present disclosure to provide an internal milling cutter enabling easy exchange of the tool holder segments. It is a further aspect of the present disclosure to provide an internal milling cutter allowing unrestricted thermal expansion of the tool holder segments in a radial direction.

At least one of the above aspects according to the present disclosure is addressed by an internal milling cutter comprising a ring shaped carrier disk having an outer circumference, an inner circumference, and a centre axis defining an axis of rotation of the milling cutter, a plurality of separated tool holder segments removably mounted at the inner circumference of the carrier disk, and at least one clamp for each tool holder segment mounted either on the carrier disk or on the tool holder segment, wherein the plurality of tool holder segments together form a ring, wherein each of the tool holder segments at its inner circumference comprises at least one cutting insert seat with a mounting element for a cutting insert or at least one cutting edge, wherein the carrier disk comprises an axial abutment surface for each of the tool holder segments providing a support of the tool holder segment in an axial direction of the carrier disk, wherein each of the tool holder segments comprises an axial contact surface in engagement with the axial abutment surface of the carrier disk, wherein the clamp is located and arranged such that it generates a force in the axial direction pressing the axial contact surface of the tool holder segment onto the axial abutment surface of the carrier disk, and wherein the clamp is mounted movably in a radial direction of the carrier disk between a locking position and a releasing position, wherein in the locking position the clamp is in engagement with the carrier disk and the tool holder segment preventing an axial separation of the carrier disk and the tool holder segment, and wherein in the releasing position the clamp allows a separation of the carrier disk and the tool holder segment in the axial direction of the carrier disk.

The centre axis of the ring-shaped carrier disk also is its axis of symmetry. This in turn falls together with the axis of rotation of the milling cutter when mounted on the machine tool.

In the present application the terms "axial", "radial" as well as "an axial direction", "a radial direction" are used. Wherein radial denotes a direction defined as perpendicular with respect to the centre axis of the carrier disk, the axial direction denotes a direction parallel to the centre axis of the carrier disk.

The milling cutter according to an embodiment of the present disclosure is advantageous as it allows to leave the ring shaped carrier disk and thus the largest mass of the milling cutter at the machine tool when exchanging the inserts mounted on the tool holder segments. Expressed in other words, the mass to be handled when changing the inserts is reduced. Furthermore an embodiment of the present disclosure allow to exchange the individual tool holder segments separately, which can further reduce the mass handled when exchanging the inserts.

In an embodiment the ring shaped carrier disk has an inner diameter in a range from 200 mm to 600 mm, or in a range from 230 mm to 470 mm.

In an embodiment the ring shaped carrier disk is made from an iron-based metal.

It is apparent that in an embodiment the ring formed by the plurality of tool holder segments is concentric with respect to the ring-shaped carrier disk. In an embodiment the ring formed by the tool holder segments has an inner diameter in a range from 150 mm to 500 mm, or in a range from 170 mm to 400 mm.

In an embodiment the tool holder segments are made from an iron-based metal.

In an embodiment all tool holder segments are identical to each other in size and/or shape.

An internal milling cutter as outlined above has advantages as it allows a replacement of a plurality of cutting edges or cutting inserts mounted on a single tool holder segment simultaneously. In particular when a milling cutter comprising cutting inserts is used the cutting inserts can be mounted onto the tool holder segments, while the tool holder segments are dismounted from the ring-shaped carrier disk, thus reducing the downtime of the machine tool.

In an embodiment each tool holder segment comprises an identical number of cutting edges or an identical number of cutting insert seats.

In an embodiment at least one of the tool holder segments comprises a plurality of cutting edges or cutting insert seats.

Furthermore, providing a plurality of cutting edges or cutting inserts on a plurality of separated tool holder segments, which are removably mounted at the inner circumference of the carrier disk further allows for a thermal expansion of each of the tool holder segments. The thermal expansion is supported by the ring being divided in a plurality of segments.

However, further measures can be taken in order to accommodate thermal expansion of the tool holder segments. Amongst these is that the clamps in an embodiment are located such that they do not interfere with a radial expansion of any of the tool holder segments. This in particular can be implemented with a clamp according to the present disclosure being mounted moveably in a radial direction of the milling cutter between a locking position and a releasing position.

Each of the clamps is located and arranged such that it generates a force in the axial direction pressing the axial contact surface of the tool holder segment onto the axial abutment surface of the carrier disk. Furthermore in an embodiment the clamp generates a radial force pressing the radial contact surface of the tool holder segment onto the radial abutment surface of the carrier disk.

Furthermore, the design of a clamp according to the present disclosure allows an easy handling of the milling cutter, wherein the clamps can be easily opened and closed when exchanging the tool holder segments.

In an embodiment the clamp is further spring biased towards the releasing position. This way after opening the clamp, e.g. by loosening its mounting screw, is automatically held in its releasing position. The allows an operator to take out tool holder segments mounted on the carrier disk and to mount new tool holder segments, while the clamps are reliably held in their open or releasing positions.

While in principle the design according to the present disclosure would work with the clamps being mounted either on the carrier disk or on the tool holder segments mounting the clamps on the carrier disk has the advantage that it reduces the number of parts when considering that in an overall system the number of tool holder segments exceeds the number tool holder segments accommodated simultaneously in the carrier disk.

In principle a clamp being mounted moveably in a radial direction of the milling cutter may be realized in different ways. One way could be to provide the clamp such that it is mounted on axis of rotation being pivotable from the locking position into the releasing position and vice versa. This pivoting motion at least has a component in the radial direction of a carrier disk.

In another embodiment the clamp is mounted to be slidably moveable in a radial direction of the carrier disk between the locking position and the releasing position. It turned out that a sliding motion of a clamp provides a higher stability due to the possibilities of guiding the clamp and is less prone to any disturbance by contaminations.

In an embodiment the clamp is slidably mounted in a guiding groove extending in the radial direction of a carrier disk, wherein the guiding groove is open towards the outer circumference of the carrier disk. As the groove is open towards the outer circumference any contamination entering into the guiding groove will be able to escape from the groove avoiding any detrimental effects of the contamination.

In an embodiment the clamp is mounted by a screw, wherein the screw is held in a female threading either in the tool holder segment or in the carrier disk.

This screw in an embodiment is only loosened, while remaining mounted, such that after loosening the clamps no component has to be removed from the milling cutter and stored.

In an embodiment the screw, the female thread and the clamp are designed such that the screw can be loosened by two revolutions, only.

In an embodiment of the disclosure, the clamp is mounted by a screw, wherein the screw is an engagement with a nut being slidably mounted in a guiding groove extending in a radial direction on the carrier disk or on the tool holder segment. This way the sliding motion of a clamp between the locking position and the releasing position can be implemented, while the screw remains at a defined position in the clamp. This in turn provides a defined clamping force in the axial direction.

In an embodiment the screw is oriented in the axial direction of the carrier disk.

In an embodiment the clamp and either the carrier disk or the tool holder segment comprise markings unambiguously denoting the locking position and the releasing position of a clamp. This way an operator can clearly identify, whether the clamps are correctly closed, i.e. positioned in the locking position. Even more important the operator can identify when the clamps are in their releasing position enabling the insertion of tool holder segments into the carrier disk with damaging the carrier disk.

In an embodiment the clamp is formed by a shim and wherein in a surface of the carrier disk once the shim is slidably mounted on the tool holder segment or in a surface of the tool holder segment once the shims slidably mounted on the carrier disk, a pocket is formed, wherein the shim in the locking position engages with the pocket.

In a further embodiment, the pocket accommodating the shim in the locking position is a continuation of the guiding groove guiding the slidably mounted shim on the element on which the shim is slidably mounted.

In an embodiment the shim has a protrusion protruding in an axial direction of the carrier disk towards the tool holder segment, wherein the protrusion in the locking position of the shim is in engagement with a recess formed in a surface of tool holder segment.

This way in the locking position the shim, the carrier disk and the tool holder segments are in a defined and reproducible relation with respect to each other. In particular the complementary protrusion and recess define the tool holder segment's position in the radial direction.

In addition the engagement between the complementary protrusion on the shim and the recess in a surface of the tool holder segment assist to transfer a radial clamping force from the shim onto the tool holder segment.

In an embodiment of the present disclosure each of the tool holder segments and the carrier disk comprise complementary protrusions and recesses being in engagement with each other in order to provide a transfer of a torque from the carrier disk onto the tool holder segments.

The clamps provide a force in the axial direction pressing the axial contact surface of the tool holder segments onto the axial abutment surface of the carrier disk and thus except for the frictional forces might not provide any stable transmission of a torque from the carrier disk to the tool holder segments. Thus recesses and protrusions being complementarily designed on the tool holder segments and on the carrier disk fulfil this purpose.

In an embodiment the protrusions and recesses each have a side wall extending in a radial direction such that a torque is transferred from the carrier disk onto the tool holder segment or vice versa. In an embodiment one of the side surfaces of the recess and one of the side surfaces of the protrusion are in a plane spanned by the centre axis of the carrier disk. This allows for an optimized transfer of a torque from the carrier disk onto the respective tool holder segment.

In another embodiment of the present disclosure the clamps are located at identical circumferential positions as the complementary protrusions and recesses provided at the tool holder segments and the carrier disk.

Each recess in an embodiment has two side surfaces extending radially such that that the two side surfaces are tapered towards the centre axis of the carrier disk enabling an unhindered radial expansion of the tool holder segment. This is in particular fulfilled if in an embodiment the side surfaces extend in perfect alignment with a radius of the carrier disk.

In another embodiment the protrusion is formed at the carrier disk and the recess is formed in the respective tool holder segment. In yet another embodiment the protrusion extends in a radial direction from the radial abutment surface of the carrier disk. The recess in this embodiment extends in the radial direction in the contact surface of the tool holder segment. In an embodiment the protrusion and the carrier disk are designed in two part form, wherein for example the protrusion is formed by a nut screwed onto the carrier disk. This way the protrusion, which is underlying a certain wear can be exchanged.

In an embodiment of the disclosure the axial abutment surface of the carrier disk is ring-shaped. As the axial contact surface of each of the tool holder segments is complementary to the axial abutment surface of the carrier disk in this embodiment each of the tool holder segments have a contact surface being part of a ring.

It shall be understood that an axial abutment surface and an axial contact surface have surface vectors showing in an axial direction.

In addition the carrier disk in an embodiment of the present disclosure comprises a radial abutment surface pointing radially inwardly for each of the tool holder segments and wherein each of the tool holder segments comprises a radial contact surface pointing radially outwardly. It shall be understood that at a surface pointing radially outwardly or inwardly the respective surface vector points radially outwardly or inwardly.

In an embodiment the radial abutment surface is ring-shaped.

In a further embodiment the axial abutment surface and the radial abutment surface in a radial cross-section have an L-shaped profile.

In an embodiment of the present disclosure the milling cutter comprises exactly three tool holder segments. Reducing the number of segments reduces the complexity of any mounting or dismounting process of the segments. However, care must be taken that the weight of each of the tool holder segments does not exceed the appropriate values still enabling a manual handling of each of the segments or a plurality thereof by an operator.

In an embodiment of the present disclosure each of the tool holder segments has a latch being spring biased in a direction perpendicular to the centre axis, wherein the latch is in engagement with a complementary recess at the carrier disk.

The spring biased latch enables a preliminary locking of each of the tool holder segments at the carrier disk even once the clamps are in their releasing position avoiding that the tool holder segments fall out of the carrier disk.

Of course in an embodiment the latch may alternatively be provided at the carrier disk and be in engagement with a complementary recess at a respective tool holder segment.

In an embodiment of the disclosure the latch and the recess are located and arranged such that they are in engagement with each other when the axial contact surface of the tool holder segment is in engagement with the axial abutment surface of the carrier disk. Thus, the latch and the recess are out of engagement with each other when the axial contact surface of the tool holder segment is distanced from the axial abutment surface of the carrier disk.

In an embodiment of the disclosure the spring in force used to bias the latch is chosen such that the latch can be brought into and out of engagement with the complementary recess via manual forces applied by an operator.

In an embodiment of the disclosure the latch is a spring biased ball pin engaging in a recess in the carrier disk formed by a part of a sphere.

In a further embodiment of the present disclosure the carrier disk comprises a guiding pin oriented in an axial direction, wherein the recess to accommodate the latch is located in the guiding pin. The guiding pin in this case not only provides a prepositioning of the tool holder segment during mounting thereof, but in combination with the latch fulfils a holding function to hold the tool holder segment at the carrier ring until the clamp has been tightened.

In a further embodiment the carrier disk comprises a guiding pin oriented in an axial direction, wherein the guiding pin has an extension in the axial direction of the carrier disk such when mounting the tool holder segment on the carrier disk the tool holder segment and the guiding pin come into engagement with each other before the axial abutment surface and the axial contact surface come into an engagement with each other.

In a further embodiment of the present disclosure the radial contact surface of the tool holder segment has a guiding chamfer which is located in an axial direction such that when mounting the tool holder segment on the carrier disk the different elements of the carrier disk and the tool holder segment come into engagement with each other in the following order:
1. the tool holder segment and the guiding pin,
2. the guiding chamfer and the radial abutment surface, and
3. the axial abutment surface and the axial contact surface.

In an embodiment of the present disclosure the tool holder segment has an insert seat for radial mounting of the cutting insert and/or for tangential mounting of the cutting insert. For radial mounting of the cutting insert the insert seat provides a contact surface having predominantly axial orientation and the insert seat for tangential mounting of the cutting insert has a contact surface having a predominantly radial orientation.

In an embodiment cutting inserts are mounted in the insert seats. In an embodiment at least one of the cutting inserts is made from a hard and wear resistant material such as cemented carbide.

In a further embodiment the internal milling tool according to the present disclosure is a milling tool for crankshaft milling. Crankshafts typically are made from an iron based metal blank.

It is a further aspect of the present disclosure to provide a mounting device with an internal milling cutter as it has been described in various embodiments thereof before.

The mounting device according to the present disclosure has a basic body with a mounting surface to accommodate the tool holder segments, a handle attached to the basic body, and at least one locking element for each tool holder segment protruding from the mounting surface, wherein each of the tool holder segments has a hole to accommodate and mount the locking element.

In an embodiment the locking element is a screw and the tool holder segment comprises an internal threading.

In a further embodiment the mounting device comprises at least one positioning pin for each of the tool holder segments protruding from the mounting surface, wherein each of the tool holder segments comprises at least one positioning hole complementarily fitting the positioning pin. This way the tool holder segments mounted on the mounting device can be positioned exactly as they are positioned once transferred from the mounting device onto the carrier disk.

In an embodiment of the mounting device the positioning hole in the tool holder segment is a through hole located such that it also accommodates a guiding pin of a carrier disk once the tool holder segments mounted on the mounting device are inserted into the carrier disk.

In an embodiment of the mounting device the handle comprises two symmetrically located T-shaped handle bars. These reduce the loads on the operator's wrists when using the mounting device.

In a further embodiment the mounting device comprises a holding element for a tool, in particular for a wrench in order to tighten and loosen screws mounting the clamps.

In another embodiment the mounting device comprises an abutment surface for each of the tool holder segments in engagement with complementary contact surfaces of the tool holder segments. In a further embodiment the abutment surface of the mounting device is a circular surface facing radially inwardly. In this case the contact surfaces of the tool holder segments are facing radially outwardly.

In an embodiment of the disclosure the basic body of the mounting device has a radial extension such that when in engagement with the tool holder segments mounted on the carrier disk the clamps are exposed.

BRIEF DESCRIPTION OF THE FIGURES

Further advantages, features and applications of the present disclosure will become apparent from the following description of embodiments and the corresponding figures attached. It should be understood that the embodiments depicted are not limited to the precise arrangements and instrumentalities shown.

DETAILED DESCRIPTION OF THE FIGURES

In the figures identical elements have been denoted by identical reference numbers.

Figure 1:
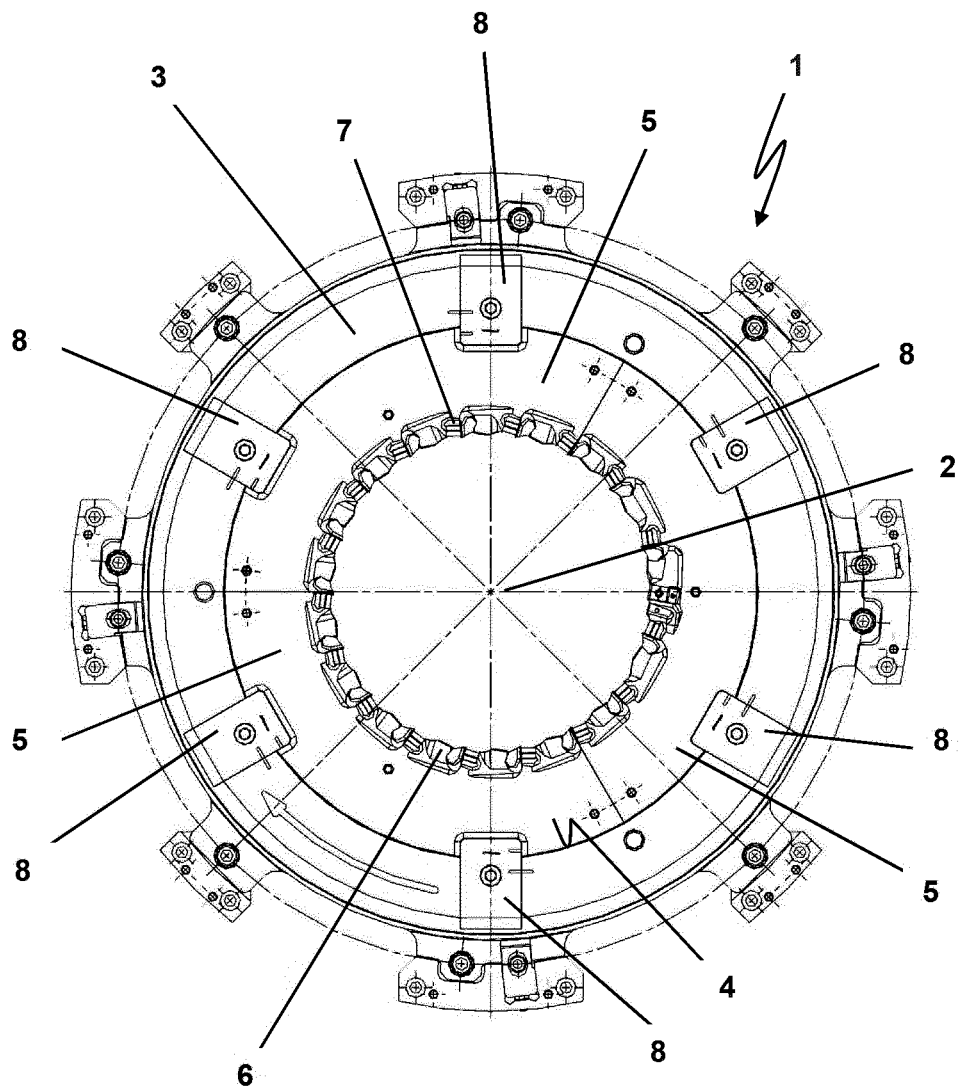
FIG. 1 is a side view of an internal milling cutter according to an embodiment of the present disclosure.

FIG. 1 is a top view in the axial direction onto an embodiment of a milling cutter 1 according to the present disclosure. FIG. 1 is given in order to identify the different elements of the internal milling cutter. The milling cutter 1 is a milling cutter provided for the milling of crankshafts. The axis of rotation of the milling cutter forms the centre axis 2 or symmetry axis of the milling cutter.

The milling cutter 1 comprises a main body in form of a ring-shaped carrier disk 3. The carrier disk 3 has an inner circumference 4 which is used to carry three tool holder segments 5. Each of the tool holder segments 5 carries a plurality of tangentially mounted cutting inserts 6 as well as a plurality of radially mounted cutting inserts 7. In the embodiment of the milling cutter 1 depicted in the figures each of the tool holder segments 5 is clamped to the carrier disk by two clamps in the form of shims 8.

By dividing the actual tool holder into three segments 5 an improved thermal management is achieved. Any heat generated in the cutting inserts 6, 7 and guided into the tool holder segments 5 will lead to a thermal expansion of the respective tool holder segments 5. Dividing into three segments allows for a less restricted expansion of each of the tool holder segments in the radial direction when compared to a tool holder formed by a full 360° ring.

In the sense of the present disclosure a radial direction is any direction following the radius of the milling cutter of FIG. 1 around its centre axis 2. Correspondingly an axial direction is any direction being parallel to the centre axis 2, i.e. extending perpendicular to the plane of projection of FIG. 1.

With reference to FIGS. 2 to 9 the functionality of the clamping of the tool holder segments 5 on the carrier ring 3 will be described below.

Figure 2A:
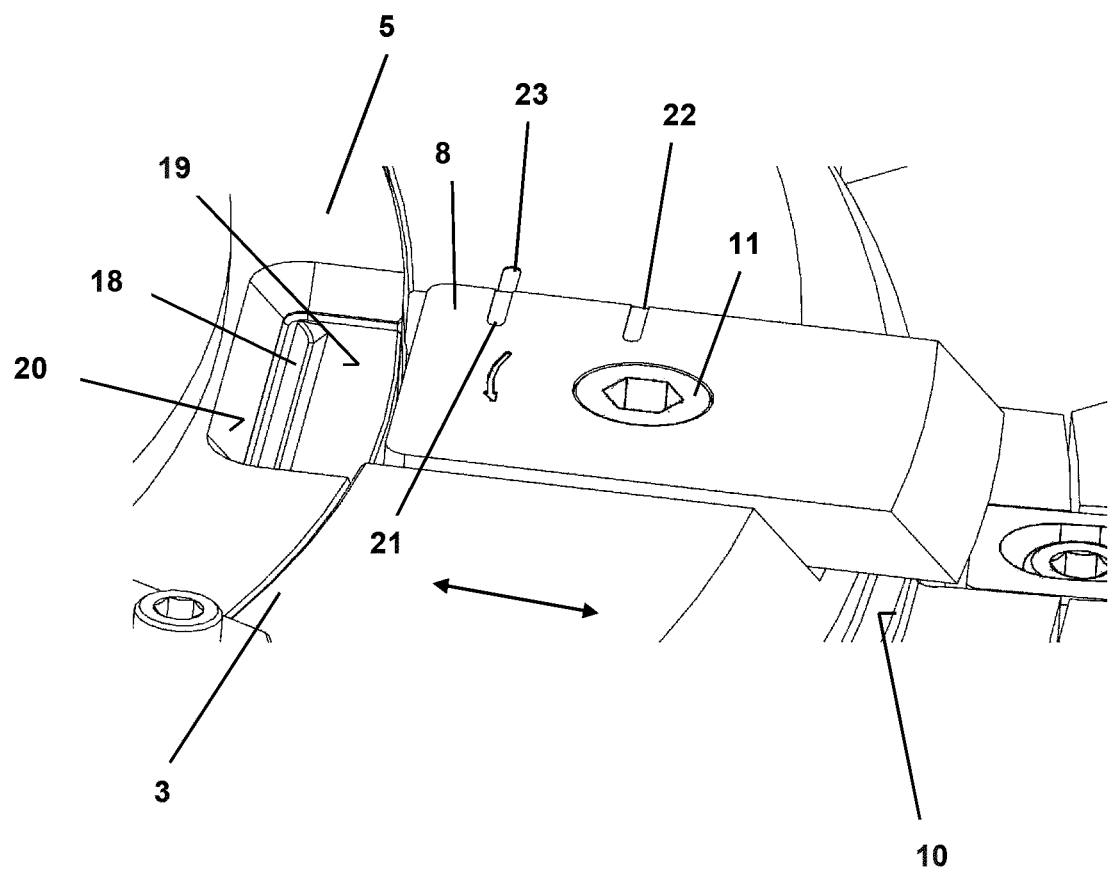
FIG. 2a) is an exaggerated perspective cutout of one of the clamps of the milling cutter of FIG. 1 in its releasing position.
Figure 2B:
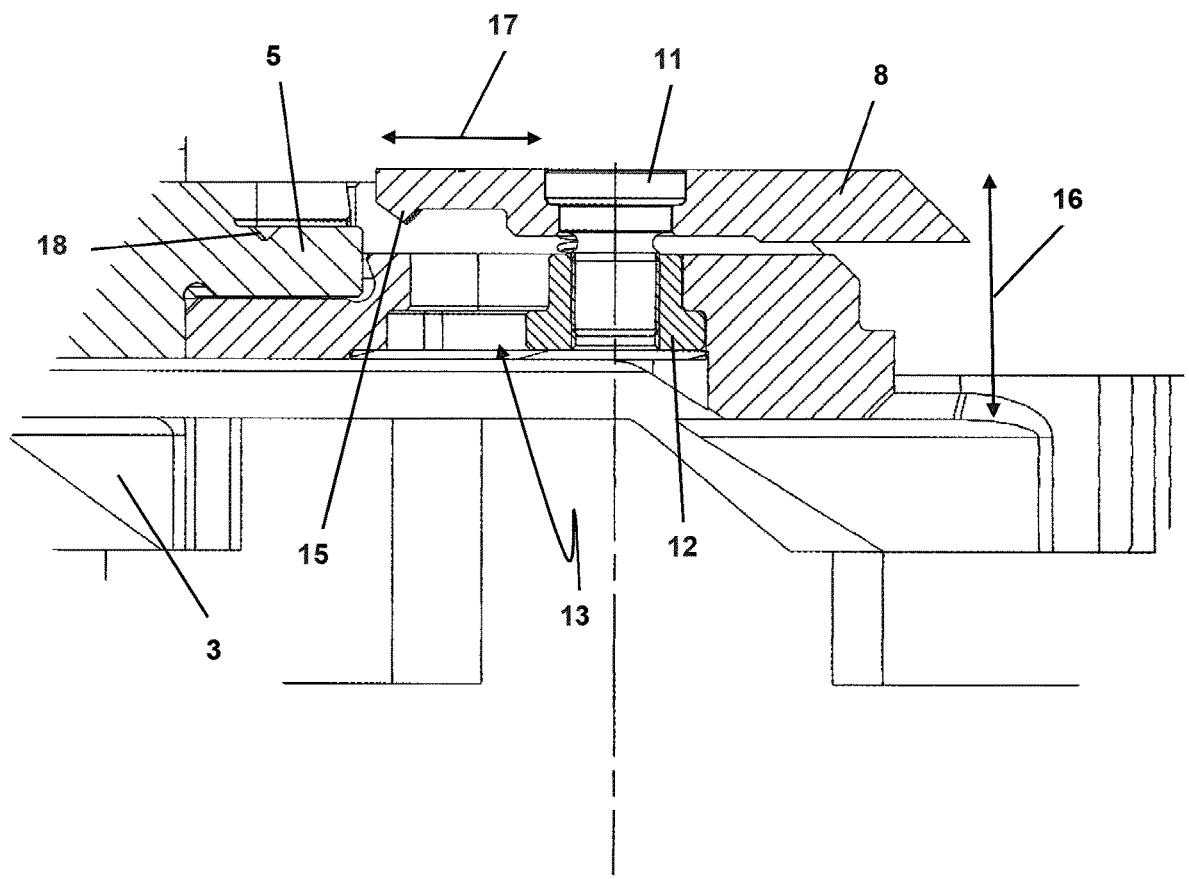
FIG. 2b) is a schematic cross-sectional view of the clamp of FIG. 2a).

FIG. 2 a) shows an exaggerated perspective of a cut out of the milling cutter 1, where a shim 8 as the clamp for the respective tool holder segment 5 is located. FIG. 2 b) shows cross-sectional view through the clap 8 of FIG. 2 a).

Figure 3A:
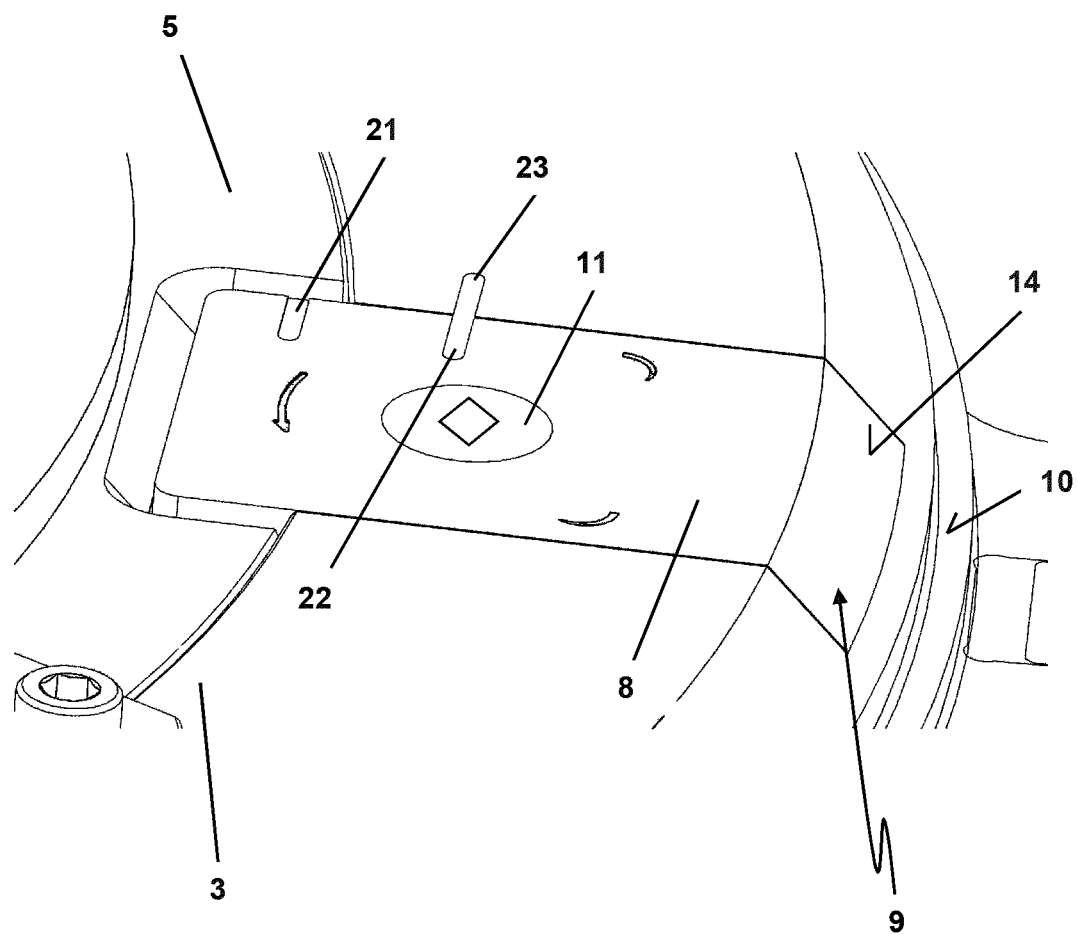
FIG. 3a) is an exaggerated perspective cutout of a clamp of the milling cutter of FIG. 1 in its locking position.
Figure 3B:
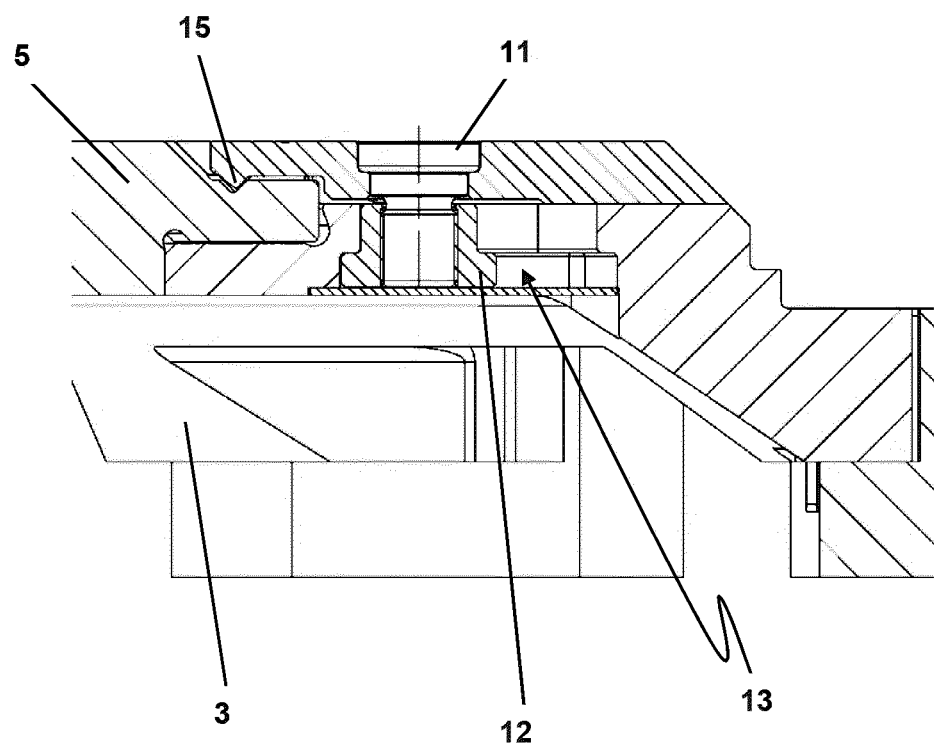
FIG. 3b) is a schematic cross-sectional view of the clamp of FIG. 3a).

While FIGS. 2a) and 2b) show the clamp 8 in its unlocked or releasing position, FIGS. 3a) and 3b) show the same clamp 8 in its closed or locking position. The shim 8 is mounted slidably in a guiding groove 9 in the carrier disk 3. The guiding groove 9 is open towards the outer circumference 10 of the carrier disk 3 in order to allow for a transport of dust and other contaminations out of the guiding groove 9.

In order to mount the shim 8 at the carrier disk 3 a screw 11 is fed through the shim 8. The screw is screwed into a nut 12 located in a guiding groove 13 milled into the carrier disk. This guiding groove 13 extends such that the nut 12 can be slidably moved in a radial direction of the carrier disk 3 once the screw 11 is loosened. As the nut 12 can be slidably moved in a radial direction, the screw 11 as well as the shim 8 attached to the screw 11 will slidably as well.

The shim 8 is secured to the head of the screw 11 such that when the screw is loosened the shim 8 is distanced from the ground 14 of the guiding groove 9 for the shim 8 in the carrier disk 3. The threading of the screw 11 and the nut 12 has been chosen such that the shim can be clamped or loosened by two full revolutions of the screw 11.

The shim 8 at its end toward the tool holder segment 5 comprises a protrusion 15 extending from the body of the shim 8 in the axial direction 16. Once the shim 8 has been slided in the radial direction 17 such that the shim 8 is in its locking position, the protrusion 15 can be axially moved into recess 18 provided at the tool holder segment 5.

The recess 18 is visible in its full extend in FIG. 2a). The recess 18 is provided in the bottom surface 19 of a pocket 20 formed in the surface of the tool holder segment 5. This pocket 20 is a continuation of the guiding groove 9 provided in the carrier disk in order to allow for a full slidable motion of the shim 8 from its releasing position into its locking position.

In order to provide an operator with an information of the state or position of the shim 8, the shim 8 as well as the carrier disk 3 comprise markings 21, 22, 23 in form of indicia. When the marking 21 on the shim 8 and the marking 23 on the carrier disk 3 are in alignment the shim 8 is in its releasing position. Once the marking 22 on the shim 8 and the marking 23 on the carrier disk 3 are in alignment, the shim 8 is in its locking position. These markings in particular facilitate exchange of the tool holder segments 5 for an operator. Before inserting the tool holder segments 5 the operator can check all shims 8 at a glance in order to verify that they are all in their releasing positions enabling insertion of the tool holder segments 5.

Figure 4:
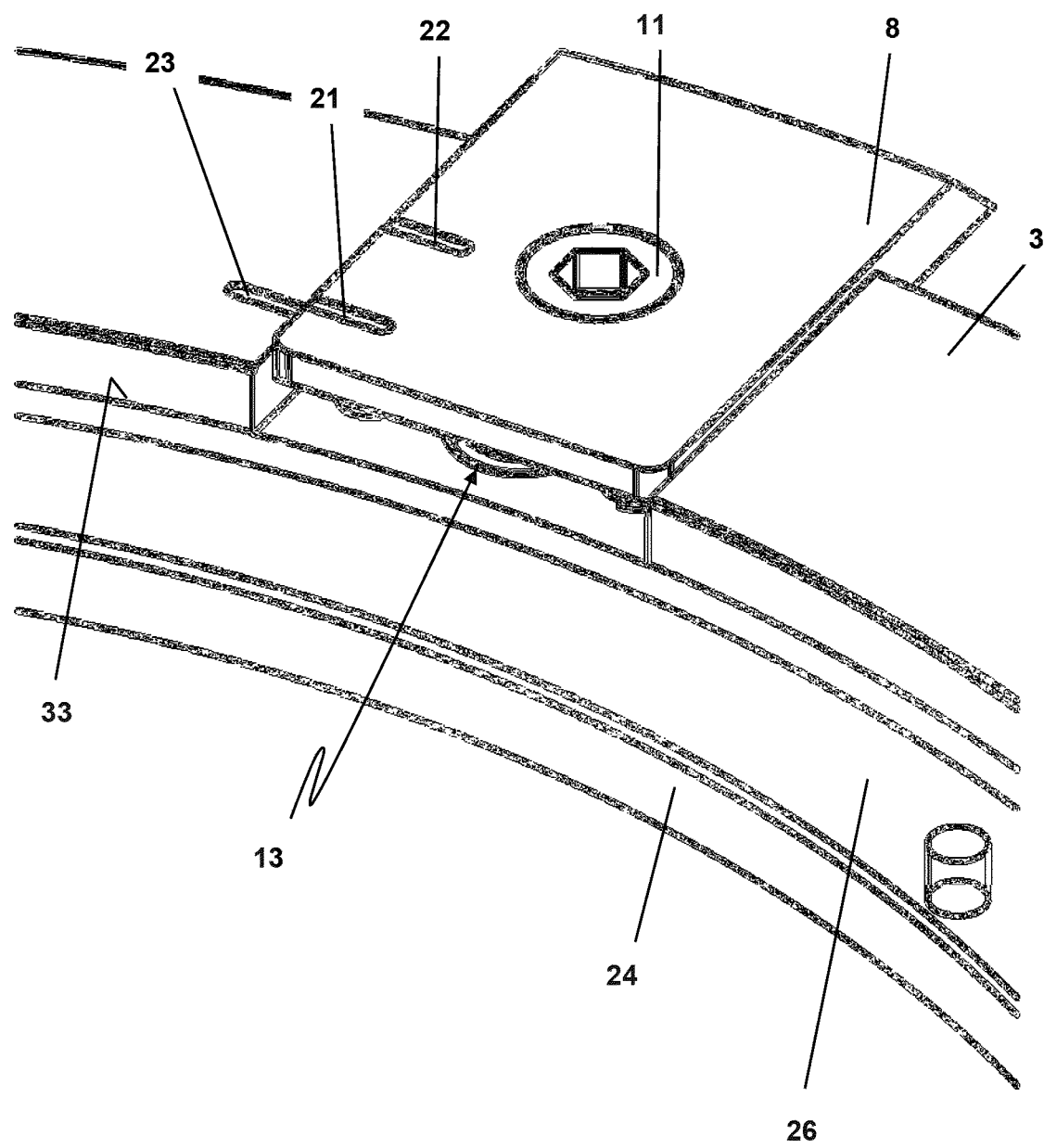
FIG. 4 is an exaggerated perspective cutout of a clamp of the milling cutter of FIG. 1 when viewed from the inner circumference of the milling cutter.
Figure 5:
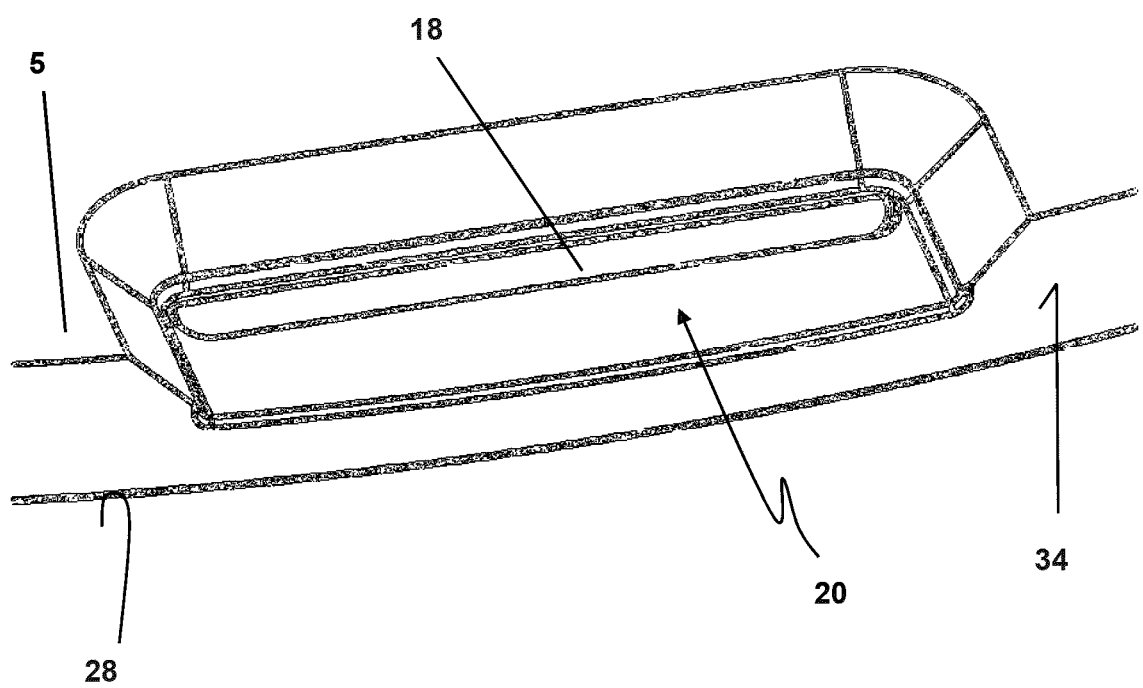
FIG. 5 is an exaggerated perspective cutout of FIG. 6.
Figure 6:
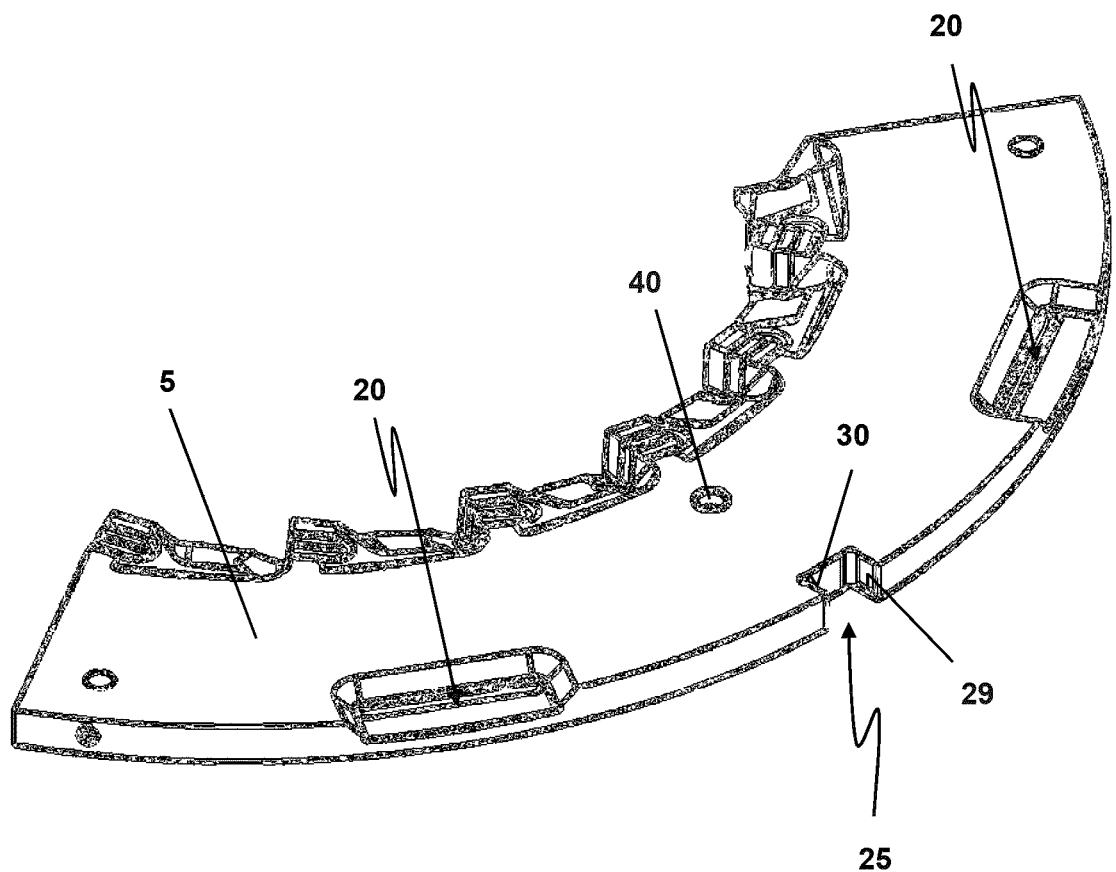
FIG. 6 is a perspective view onto the outer circumference of a tool holder segment of the milling cutter of FIG. 1.

FIG. 4 is a perspective cut away drawing of the carrier disk 3 from its inner circumference 24.

The shim 8 is depicted in its releasing position. From this perspective the guiding groove 13 for the nut 12 in the carrier disk 3 is well visible.

Due to the screw mounting the transfer of a torque from the driven carrier disk 3 of the milling cutter 1 via the shim 8 onto the tool holder segment 5 would lead to a fast wear of the shim 8 and in addition the entire mill would lack the required precision. Thus the carrier disk 3 and each of the tool holder segments 5 comprise additional complementary elements for the transfer of a torque from the carrier disk onto the tool holder segments.

In the particular embodiment depicted in the figures these two complementary elements are formed by a protrusion (not shown in the figure) from the radial abutment surface 33 of the carrier disk 3 as well as a recess 15 extending from the radial contact surface 34 of the tool holder segment 5. In the present embodiment each of the tool holder segments 5 comprises one recess 25. The location of the recess 25 is visible in the perspective view of a tool holder segment 5 in FIG. 6.

The side walls 29, 30 of the recess 25 and the side walls of the protrusion are arranged exactly on the radius of the milling cutter 1 such that thermal expansion of the segment is not hindered by the side walls 29, 30 of the recess 25 or the side walls of the protrusion.

In addition the two side walls 29, 30 are located in a plane spanned by the centre axis 2 of the milling cutter 1. It is apparent that the side walls of the protrusion on the carrier disk 3 have complementary shape with respect to the side walls of the recess 25.

The axial abutment surface 26 of the carrier disk 3 itself forms a ring, wherein the contact surfaces 28 of the tool holder segments 5 form sections of a ring.

In addition to the axial abutment surface 26 the carrier disk 3 has a radial abutment surface 33, which is complementary to an outer circumference or radial contact surface 34 of the tool holder segment 5. However, when mounted a gap is provided between the radial abutment surface 33 and the radial contact surface 34 in order to allow for a thermal expansion of the tool holder segment 5 in the radial direction. Furthermore, a gap is provided between the circumferential surface 35 of the protrusion 27 and the circumferential end surface 36 of the recess 25.

The shim 8 is located and arranged such that once the screw 11 is tightened in the locking position of the shim 8, the shim 8 generates a force in the axial direction pressing the axial contact surface 28 of the tool holder segment 5 onto the axial abutment surface 26 of the carrier disk 3 and such that the shim 8 generates a radial force pressing the radial contact surface 34 of the tool holder segment 3 onto the radial abutment surface 33 of the carrier disk 3.

Figure 7:
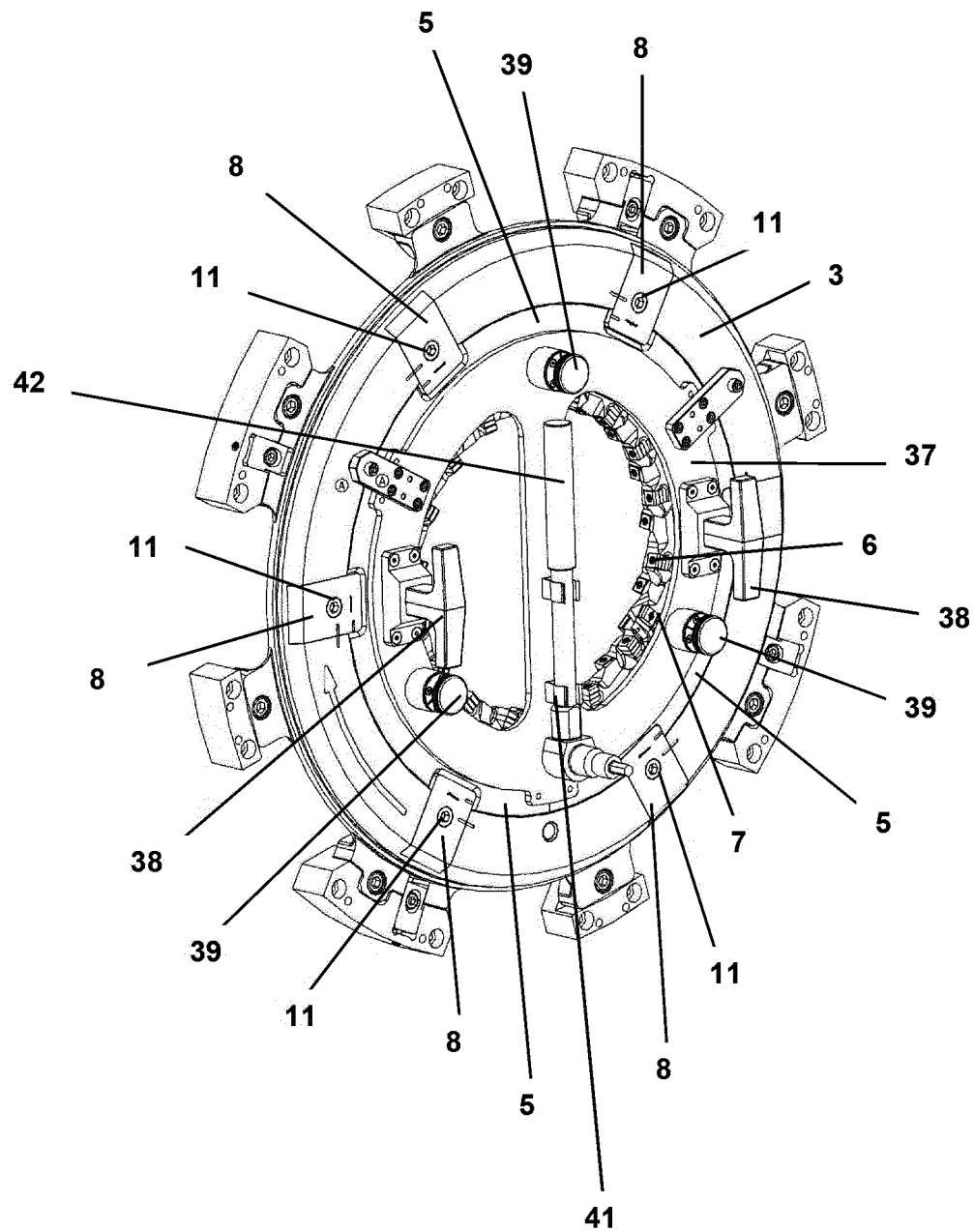
FIG. 7 is a perspective front view of the milling cutter of FIG. 1 with a handling device mounted on the tool holder segments.

The tool holder segments 5 can be easily mounted in the carrier disk 3 using a mounting device 37 as depicted in FIG. 7. The mounting device 37 comprises two T-shaped handle bars 38 which can be gripped by an operator in order to easily mount all three tool holder segments 5 at the carrier disk 3 simultaneously. This way the segments equipped with the cutting inserts 6, 7 can be readily exchanged.

Each of the tool holder segments 5 is mounted and positioned on the mounting device by a positioning pin 49 (depicted in the FIG. 9) in a corresponding positioning hole in the respective tool holder segment 5 and a mounting screw 39 engaging into a corresponding threaded hole (denoted by reference number 40 in FIG. 6) in the respective tool holder segment 5.

The basic body of the mounting device 37 is ring-shaped, wherein the ring of the basic body has a diameter being small enough in order to expose the shims 8 of the tool holder segments 5 in their locking positions as well as in their releasing positions.

Furthermore, the mounting device 37 comprises a holder 41 to hold a wrench 42, wherein this wrench 42 matches the screws 11 of the shims 8.

In addition the shims 8 are spring biased into the releasing position in order to reliably hold them in their releasing position when entering the three tool holder segments 5 into the carrier disk 3.

Imagining a single operator having two hands a critical situation could arise once the three tool holder segments 5 have successfully been inserted into the carrier disk 3 while all the shims 8 are held in their releasing position. Once both hands are needed in order to move each of the shims 8 from their releasing positions into their locking positions and to tighten the screws 11, the tool holder segments 5 together with the mounting device 37 could fall out of the carrier disk 3 again.

Figure 8:
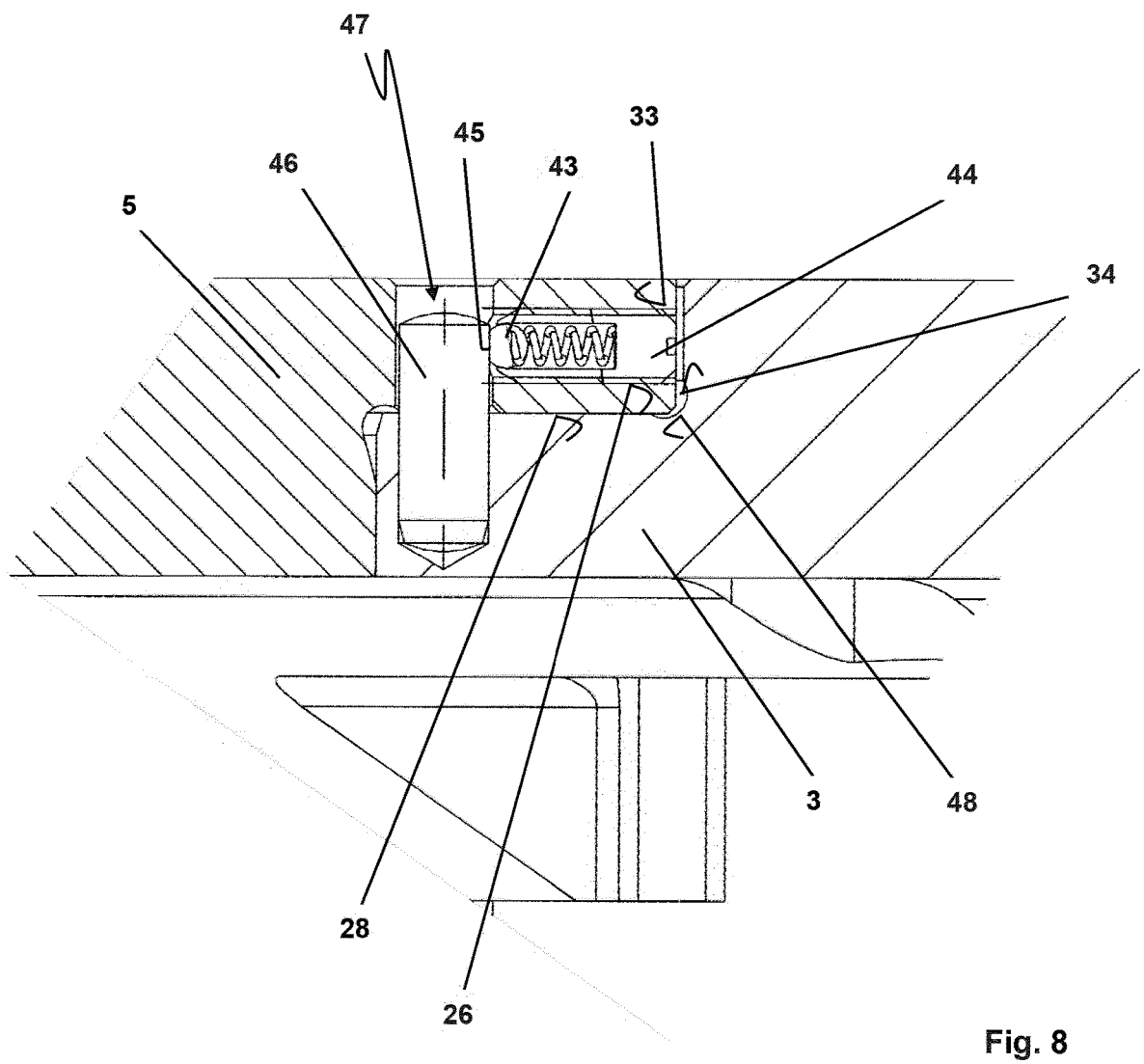
FIG. 8 is an exaggerated cross-sectional cutout of the milling cutter of FIG. 1 in a plane perpendicular to the radius.
Figure 9:
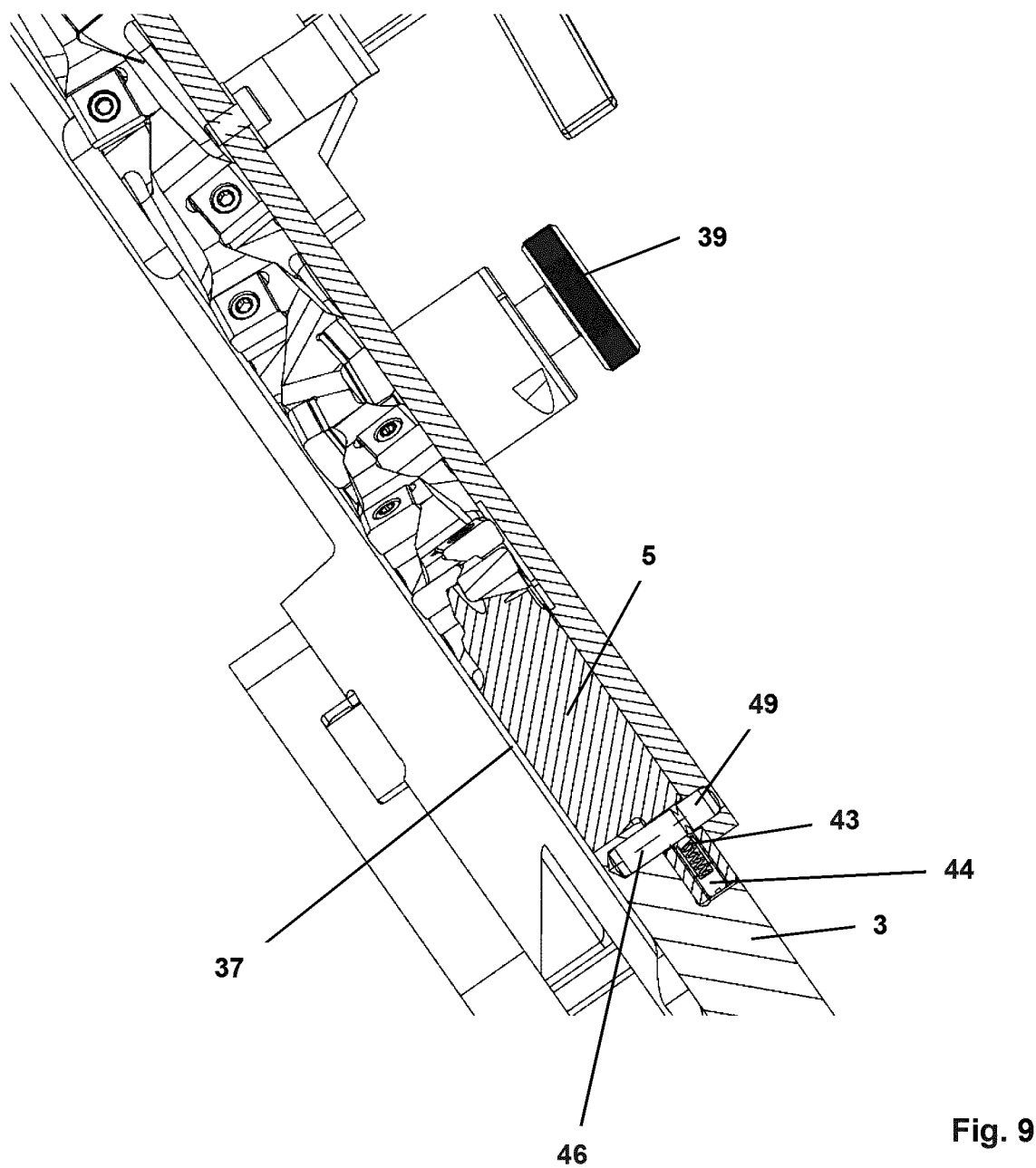
FIG. 9 is a partially cut away cutout of the milling cutter and handling device of FIG. 7.

In order to avoid such a situation each of the tool holder segments 5 comprises a spring biased latch depicted in FIGS. 8 and 9. The spring biased latch in the embodiment shown has the form of a spring biased ball pin, i.e. a ball 43 mounted in a cylindrical holder 44. The ball 43 is moveable against the force of a spring (not depicted in the figures) in a direction perpendicular to the axial direction. The ball 43 engages in a recess 45, wherein the recess 45 is located at the carrier disk 3. The recess has the form of a partial sphere.

The recess 45 more precisely is located in a guiding pin 46 accommodated in the axial abutment surface 26 of the carrier disk 3. The guiding pin 46 protrudes perpendicularly from the axial abutment surface 26. The force of the spring biasing the ball 43 into the recess 45 in the position pin 46 has been chosen such that it reliable holds a segment and the mounting device 37 at the carrier disk 5 when the carrier disk 5 is oriented vertically, i.e. with its centre axis horizontally.

The guiding pin 46 furthermore serves to guide the tool holder segment 5 when being inserted into the carrier disk 3. Therefore, the length of the guiding pin 46 has been chosen such that when inserting the tool holder segment 5 into the carrier disk 3 a first contact is established between a positioning hole 47 in the tool holder segment 5 and the guiding pin 46. Then a guiding chamfer 48 at the radial contact surface 34 of the tool holder segment 5 gets into contact with the radial abutment surface 33 and last but not least the axial abutment surface 26 of the carrier disk 3 and the axial contact surface 28 of the tool holder segment 5 are contacted. This way the precision ground contact surface 26 and abutment surface 28 will not experience any relative motion with respect to each other once already in engagement with each other.

While FIG. 8 shows a cross-sectional view of the combination of the guiding pin 46 and the ball pin 43, 44 the same arrangement is depicted in the broken away cutout of FIG. 9. In addition to the information provided in FIG. 8, FIG. 9 shows that the positioning hole 47 in the tool holder segment 5 simultaneously accommodates the guiding pin 46 of the carrier disk 3 and the positioning pin 49 of the mounting device 37.

For purposes of original disclosure it is pointed out that all features which are apparent for a person skilled in the art from the present description, the figures and the claims, even if they have only been described with further features, could be combined on their own or together with all the combinations of the features disclosed herein, if not excluded explicitly or technically impossible. A comprehensive explicit description of all possible combinations of features is only omitted in order to provide readability of the description.

REFERENCE LIST 1 milling cutter
2 axis of rotation/centre axis
3 carrier disk
5 tool holder segment
6 tangentially mounted cutting insert
7 radially mounted cutting insert
8 shim/clamp
9 guiding groove of the shim 8
10 outer circumference of the carrier disk
11 screw
12 nut
13 guiding groove of the nut 12
14 ground
15 protrusion
16 axial direction
17 radial direction
18 recess
19 bottom surface of the pocket 20
20 pocket
21, 22, 23 markings
24 inner circumference
25 recess
26 axial abutment surface
28 axial contact surface of the tool holder segment 5
29, 30 side walls
33 radial abutment surface
34 radial contact surface
37 mounting device
38 handle bar
39 mounting screw
40 threaded hole
41 holder for tool 42
42 wrench
43 ball
44 cylindrical holder
45 recess for the ball
46 guiding pin of the carrier disk 3
47 positioning hole
48 guiding chamfer
49 positioning of the mounting device 37

The invention claimed is:

1. An internal milling cutter comprising:
a ring shaped carrier disk having an outer circumference, an inner circumference, a center axis defining an axis of rotation of the milling cutter, and a plurality of separated tool holder segments removably mounted at the inner circumference of the carrier disk; and
at least one clamp for each of the plurality of tool holder segments mounted either on the carrier disk or on the tool holder segment, wherein the plurality of tool holder segments together form a ring, and wherein each of the plurality of tool holder segments at its inner circumference includes at least one cutting insert seat with a mounting element for a cutting insert or at least one cutting edge, the carrier disk including an axial abutment surface for each of the plurality of tool holder segments, the axial abutment surface supporting each of the plurality of tool holder segments in an axial direction of the carrier disk, each of the plurality of tool holder segments including an axial contact surface in engagement with the axial abutment surface of the carrier disk, and wherein the clamp is located and arranged such that it generates a force in the axial direction pressing the axial contact surface of the tool holder segment onto the axial abutment surface of the carrier disk, and wherein the clamp is mounted movably in a radial direction of the carrier disk between a locking position and a releasing position, wherein in the locking position the clamp is in engagement with the carrier disk and the tool holder segment preventing an axial separation of the carrier disk and the tool holder segment, and wherein in the releasing position the clamp allows a separation of the carrier disk and the tool holder segment in the axial direction of the carrier disk,
wherein each of the plurality of tool holder segments and the carrier disk include complementary protrusions and recesses and in engagement with each other in order to provide a transfer of a torque from the carrier disk onto the plurality of tool holder segments, and
wherein each recess and each protrusion has two side surfaces extending radially such that the two side surfaces taper towards the center axis of the carrier disk enabling a radial expansion of each of the plurality of tool holder segments.

2. The milling cutter according to claim 1, wherein the clamp is spring biased towards the releasing position.

3. The milling cutter according to claim 1, wherein the clamp is slidably mounted.

4. The milling cutter according to claim 1, wherein the clamp is slidably mounted in a guiding groove extending in a radial direction of the carrier disk, wherein the groove is open towards the outer circumference of the carrier disk.

5. The milling cutter according to claim 1, wherein the clamp is mounted by a screw and wherein the screw is in engagement with a nut being slidably mounted in a guiding groove extending in a radial direction on the carrier disk or on each of the plurality of tool holder segments.

6. The milling cutter according to claim 1, wherein the clamp and either the carrier disk or each of the plurality of tool holder segments includes markings denoting the locking position and the releasing position of the clamp.

7. The milling cutter according to a claim 1, wherein the clamp is formed by a shim and wherein in a surface of the carrier disk or in a surface of each of the plurality of tool holder segments, a pocket is formed, wherein the shim in the locking position engages with the pocket.

8. The milling cutter according to claim 1, wherein one of the two side surfaces lies in a plane tilted with respect to the center axis to facilitate insertion of the complementary projection into the recess.

9. The milling cutter according to claim 1, wherein the clamps are located at same circumferential positions as the complementary protrusions and recesses.

10. The milling cutter according to claim 1, wherein the carrier disk includes a radial abutment surface pointing radially inwardly for each of the plurality of tool holder segments and wherein each of the plurality of tool holder segments includes a radial contact surface pointing radially outwardly, and wherein the carrier disk and the plurality of tool holder segments are arranged such that there is a gap between the radial abutment surface of the carrier disk and the radial contact surface of each of the plurality of tool holder segments at room temperature allowing for a thermal expansion of the plurality of tool holder segments in a radial direction.

11. The milling cutter according to claim 1, wherein each of the plurality of tool holder segments has a latch being spring biased in a direction perpendicular to the center axis, wherein the latch is in engagement with a recess at the carrier disk.

12. The milling cutter according to claim 11, wherein the carrier disk includes a guiding pin oriented in an axial direction, wherein the recess is located in the guiding pin, and wherein the guiding pin of the carrier disk has an extension in the axial direction of the carrier disk such that when mounting each of the plurality of tool holder segments on the carrier disk each of the plurality of tool holder segments and the guiding pin come into engagement with each other before the axial abutment surface and the axial contact surface come into engagement with each other.

13. A mounting device comprising:
   an internal milling cutter according to claim 1;
   a basic body with a mounting surface arranged to accommodate the plurality of tool holder segments;
   a handle attached to the basic body; and
   at least one locking element for each of the plurality tool holder segments protruding from the mounting surface, wherein each of the plurality of tool holder segments has a hole to accommodate and mount the locking element.

* * * * *